United States Patent [19]
Kakimoto

[11] Patent Number: 4,505,461
[45] Date of Patent: Mar. 19, 1985

[54] FLUID-FILLED ENGINE MOUNT DEVICE

[75] Inventor: Toshihiko Kakimoto, Tokyo, Japan

[73] Assignee: Nissan Motor Company, Limited, Yokohama, Japan

[21] Appl. No.: 326,567

[22] Filed: Dec. 2, 1981

[30] Foreign Application Priority Data

Dec. 3, 1980 [JP] Japan .............................. 55-170508
Feb. 2, 1981 [JP] Japan .............................. 56-13898

[51] Int. Cl.³ ............................................. F16F 13/00
[52] U.S. Cl. .................................................. 267/140.1
[58] Field of Search ............... 248/562; 267/35, 140, 267/140.1, 141.1, 153

[56] References Cited

U.S. PATENT DOCUMENTS 4,159,091 6/1979 Le Salver et al. ............... 248/562

FOREIGN PATENT DOCUMENTS

| 945899 | 7/1956 | Fed. Rep. of Germany . | |
| 2117240 | 7/1972 | France . | |
| 2349066 | 11/1977 | France . | |
| 149436 | 11/1980 | Japan .............................. | 267/140.1 |
| 755808 | 8/1956 | United Kingdom . | |
| 756416 | 9/1956 | United Kingdom . | |
| 888908 | 2/1962 | United Kingdom . | |
| 2033534 | 5/1980 | United Kingdom . | |

*Primary Examiner*—Duane A. Reger
*Attorney, Agent, or Firm*—Schwartz, Jeffery, Schwaab, Mack, Blumenthal & Koch

[57] ABSTRACT

An engine mount device comprising first and second base plate members which are spaced from each other; an elastic block securely interposed between the first and second base plate members and formed with a cavity; a partition wall member connected to the first base plate member and including a projecting section which projects into and is located within the elastic block cavity, the partition wall member defining within the elastic block cavity a fluid chamber to be filled with a fluid and being formed with an orifice; and a diaphragm member connected to the partition wall member and including a projecting section which projects into and is located within the elastic block cavity, said diaphragm member defining between it and the partition wall member an auxiliary chamber which communicates with the fluid chamber through the partition wall member orifice, a major part of the auxiliary chamber being located with the elastic block cavity, thereby saving the amount of the fluid used in the device.

10 Claims, 4 Drawing Figures

FLUID-FILLED ENGINE MOUNT DEVICE

BACKGROUND OF THE INVENTION

1. Field of the Invention

This invention relates to an engine mount device through which a power plant is mounted to a support body, and more particularly to an engine mount device of the type wherein a fluid is filled therein to support an internal combustion engine of an automotive vehicle.

2. Description of the Prior Art

In connection with engine mount devices, there is a fluid-filled engine mount device through which, for example, an automotive internal combustion engine is mounted on a vehicle body frame. The fluid-filled engine mount device is usually composed of a pipe-like rubber block which is formed throughout its length with a central cavity. A flat partition wall member is disposed on the top of the rubber block so that the rubber block cavity serves as a fluid chamber to be filled with a fluid. Additionally, a diaphragm member is disposed on the partition wall member to define between it and the partition wall member an auxiliary chamber which communicates through the partition wall member orifice with the fluid chamber, in which the fluid is capable of flowing from the fluid chamber to the auxiliary chamber.

However, the engine mount device of this type has encountered various problems one of which is as follows: it is necessary to fully fill the whole rubber block cavity with the fluid. Therefore, a large amount of the fluid must be used for each engine mount device, which is wasteful of the fluid and undesirable from the economical view point.

BRIEF SUMMARY OF THE INVENTION

In accordance with the present invention, an engine mount device comprises first and second base plate members. An elastic block having a cavity is securely interposed between the first and second base plate members. A partition wall member having an orifice is connected to the first base plate member and formed with a projecting section which projects into and is located within the elastic block cavity. The partition wall member defines within the elastic block cavity a fluid chamber to be filled with a fluid. Additionally, a diaphragm member is connected to the partition wall member and formed with a projecting section which projects into and is disposed within the elastic block cavity. The diaphragm member defines between it and the partition wall member an auxiliary chamber which communicates with the fluid chamber through the partition wall member orifice so that a major part of the auxiliary chamber is located within the elastic block cavity. With the thus arranged engine mount device, the necessary amount of the fluid filled in the device is small as compared with in the conventional device, thereby saving the fluid amount used in the device. Therefore, the engine mount device according to the present invention is greatly improved from the economical standpoint.

BRIEF DESCRIPTION OF THE DRAWINGS

The features and advantages of the engine mount device according to the present invention will be more clearly appreciated from the following description taken in conjunction with the accompanying drawings in which like reference numerals designate like parts and elements, and in which.

DETAILED DESCRIPTION OF THE INVENTION

Figure 1:
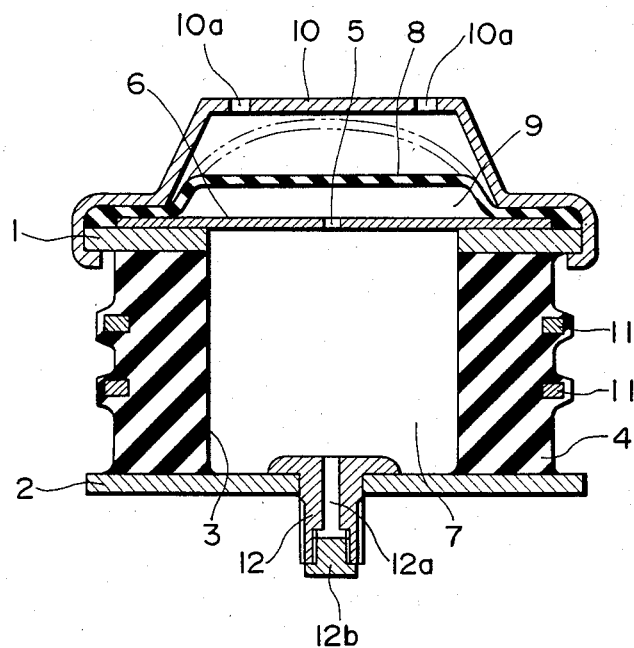
FIG. 1 is a vertical sectional view of a conventional engine mount device.

To facilitate understanding the present invention, a brief reference will be made to a conventional fluid-filled engine mount device, depicted in FIG. 1. Referring to FIG. 1, the conventional engine mount device includes an upper base plate member 1 connected to a power unit side and a lower base plate member 2 connected to a vehicle frame side. A rubber block 4 is securely interposed between the upper and lower base plate members 1, 2 and is generally of the pipe shape so as to be formed with a central cavity 3. In this connection, the upper base plate member 1 is formed with an opening corresponding to the rubber block cavity 3. A flat partition wall member 6 having an orifice 5 is securely mounted on the upper base plate member 1 to define a fluid chamber 7 at the downward side of the upper base plate member 1, so that the rubber block cavity 3 corresponds to the fluid chamber 7. Additionally, a diaphragm member 8 is disposed on the partition wall member 6 to define an auxiliary chamber 9 which communicates through the orifice 5 with the fluid chamber 7.

Disposed on the diaphragm member 8 is a cover member 10 whose peripheral section is crimped to fix the peripheral sections of the diaphragm member 8 and the partition wall member 6 on the upper base plate member 1. The cover member 10 is formed with openings 10a through which atmospheric air passes. Rigid rings 11 are embedded in the rubber block in the vicinity of the outer surface thereof, which rigid rings serve to prevent the rubber block from inflating in the radial direction thereof. The reference numeral 12 designates a bolt for securing the lower base plate member 2 to a vehicle frame or the like. The bolt 12 is formed axially with a hole 12a through which a fluid is filled into the fluid chamber 7. The bolt hole 12a is closed by a screw 12b. The fluid is filled also in the auxiliary chamber 9.

With this arrangement, when the distance between the upper and lower base plate members 1, 2 varies during the bounding or the like of the vehicle body, the axial length of the rubber block 4 extends or contracts. This makes the volume variation of the fluid chamber 7 and therefore the fluid moves reciprocally from the fluid chamber 7 to the axuiliary chamber 9 and vice versa. Such reciprocal movement of the fluid is carried out through the orifice 5, and consequently the load applied to the rubber block 4 is damped during fluid passing through the orifice 5. Since the diaphragm inflates as indicated in phantom lines in FIG. 1 with the fluid movement from the fluid chamber 7 to the auxiliary chamber 9, the cover member is formed to project upwardly in order to permit such inflation of the diaphragm member 8.

However, the following drawbacks have been unavoidably encountered in the above-arranged conventional fluid-filled engine mount device: The fluid must be fully filled in the rubber block cavity 7 and additionally into the auxiliary chamber 9. Therefore, a considerably large amount of the fluid is necessary, which is wasteful of the fluid. Besides, in order to fill the fluid also into the auxiliary chamber 9 which is located outside of the rubber block cavity 7, the filling operation of the fluid must be carried out by dipping the entire engine mount device in the fluid to be filled therein, or otherwise by supplying the fluid into the engine mount device through the fluid filling hole 12a formed at the bottom section of the engine mount device. Furthermore, when the diaphragm member 8 largely upwardly inflates, the connection of the diaphragm member with the partition wall member will loosen, which may result in leaking of the fluid.

Figure 2:
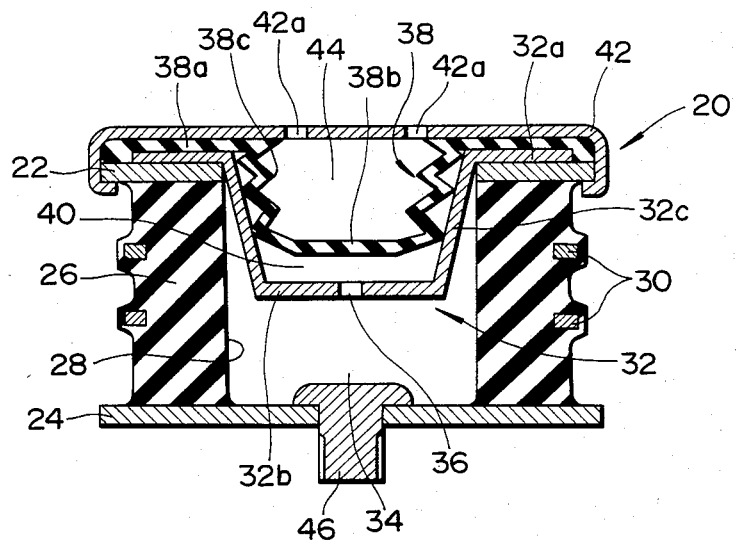
FIG. 2 is a vertical sectional view of a preferred embodiment of an engine mount device in accordance with the present invention.
Figure 3:
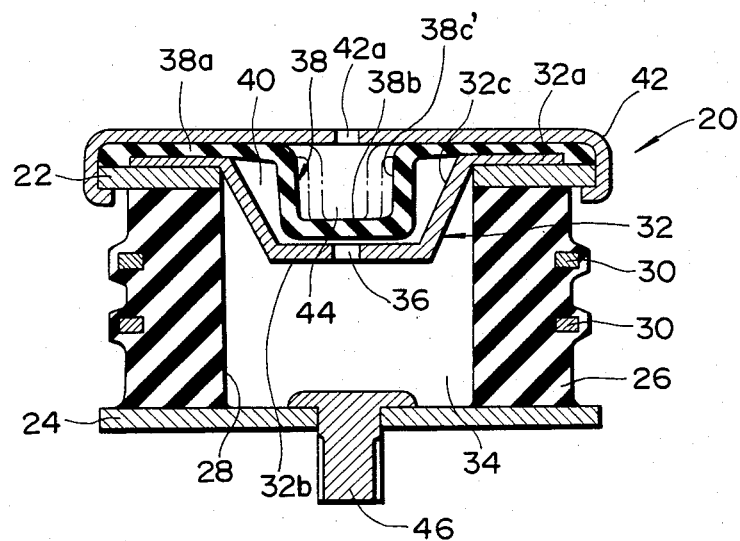
FIG. 3 is a vertical sectional view of another embodiment of the engine mount device in accordance with the present invention.
Figure 4:
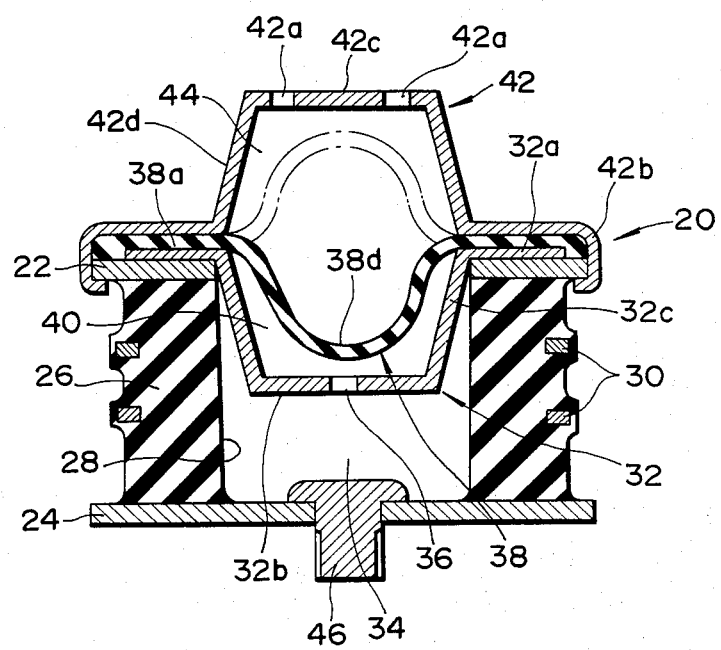
FIG. 4 is a vertical sectional view of a further embodiment of the engine mount device in accordance with the present invention.

In view of the above description of the conventional engine mount device, reference is now made to FIGS. 2 to 4, and more specifically to FIG. 2, wherein a preferred embodiment of a fluid-filled engine mount device of the present invention is illustrated by the reference numeral 20. The engine mount device 20 comprises an upper or first base plate member 22 and a lower or second base plate member 24 which are disposed spaced from each other. The upper base plate member 22 is connected to a power unit such as an automotive internal combustion engine, whereas the lower base plate member 24 is connected to a support member such as an automotive vehicle body frame.

A block 26, made of elastic or elastomeric material such as rubber, is interposed between the upper and lower base plate members 22, 24 so as to be securely connected to the base plate members maintaining fluid-tight seal. The elastic block 26 is generally in the shape of a pipe and therefore formed with a central cavity or hollow 28. In this instance, the cavity 28 is formed along the axis of the elastic block 26 and has the same sectional area throughout the length of the elastic block. In this connection, the upper base plate member 22 is also formed with an opening (no numeral) of the shape corresponding to the section of the elastic block cavity 28. Two rigid rings 30 are embedded in the elastic block 26 in the vicinity of the outer peripheral surface, in order to prevent the elastic block 26 from inflating in the radial direction thereof.

A partition wall member 32 is securely attached at its flat peripheral section 32a to the upper base plate member 22. The partition wall member 32 further has a flat central section 32b which is integrally connected to the peripheral section 32a through a generally vertically elongated mid-section 32c. As shown, the partition wall member mid-section 32c projects through the opening of the upper base plate member 22 into the cavity 28 of the elastic block 26 so that the central section 32b is located at a considerably deep position within the cavity 28. The thus formed partition wall member 32 defines within the elastic block cavity 28 a fluid chamber 34 which is filled with a fluid such as a liquid. The partition wall member 32 is formed at its central section 32b with an orifice 36.

A diaphragm member 38 is securely attached at its flat peripheral section 38a to the partition wall member peripheral section 32a. The diaphragm member 38 has a lower and projected central section 38b which is integrally connected to the peripheral section 38a through a bellows mid-section 38c. As shown, the diaphragm member mid-section 38c projects into and is disposed within a cup-shaped cavity (no numeral) formed by the partition wall member mid-section 32c, so that the diaphragm member central section 38b is located within the elastic block cavity 28. The diaphragm member 38 defines between it and the partition wall member 32 an auxiliary chamber 40 which is in communication with the fluid chamber 28 through the orifice 36 so that the auxiliary chamber 40 is filled with the same fluid as in the fluid chamber 34.

A cover member 42 is provided to tightly hold the partition wall member and diaphragm member peripheral sections 32a, 38a between it and the upper base plate member 22 so as to maintain fluid-tight seal among them. The peripheral section of the cover member 42 is crimped or caulked on the peripheral section of the upper base plate member 22. As shown, the cover member 42 is flat at its top surface and defines an air chamber 44 between it and the diaphragm member 38, which air chamber is in communication with atmospheric air through openings 42 which are formed through the cover member 42. The reference numeral 46 designates a bolt for securing the lower base plate member 24 onto the support member such as the vehicle body frame.

The manner of operation of the thus arranged engine mount device will be discussed hereinafter.

When the engine mount device 20 receives a force in the axial direction thereof during bounding or the like of a vehicle body, the distance between the upper and lower base plate members 22, 24 varies, so that the elastic block 26 extends or contracts in its axial direction, thereby varying the volume of the fluid chamber 34. In order that this fluid chamber volume change is to be proportional to the extension-contraction amount of the elastic block 26, the embedded rings 30 prevent the elastic block 26 from inflating in the radial direction thereof. When the elastic block 26 is compressed to contract in its axial direction, the volume of the fluid chamber 34 decreases and accordingly a part of the fluid within the fluid chamber 34 moves through the orifice 36 into the auxiliary chamber 40. As a result, the volume of the auxiliary chamber 40 increases to contract the bellows mid-section 38c of the diaphragm member 38 so that the diaphragm member central section 38b moves to the cover member side or upwardly in FIG. 2.

When the elastic block is extended in its axial direction, the volume of the fluid chamber 34 increases and therefore the fluid pressure within the fluid chamber 34 is lowered, so that the fluid within the auxiliary chamber 40 moves through the orifice 36 into the fluid chamber 34. As a result, the volume of the auxiliary chamber 40 decreases, and consequently the bellows mid-section 38c of the diaphragm member 38 extends so that the diaphragm member central section 38b approaches the central section 32b of the partition wall member 32. Thus, the extension or contraction of the elastic block 26 under the action of the applied vibrational force causes fluid movement from the fluid chamber 34 to the auxiliary chamber 40 and vice versa. During such fluid movement through the orifice 36, the moving fluid is subjected to flow restriction to provide vibration suppression effect on the applied vibrational force, thereby effectively damping the vibration applied to the engine mount device 20.

Although the diaphragm member central section 38b approaches the cover member 42 as discussed above when the volume of auxiliary chamber 40 increases, it will be understood that the diaphragm member central section 38b never moves upwardly over the level of the peripheral section 38a of the diaphragm member 38, thereby not making the action by which the diaphragm member peripheral section 38a is forced to separate from the partition wall member peripheral section 32a. As a result, even when the elastic block 26 is suddenly compressed, the fluid is prevented from leaking between the diaphragm member and partition wall member peripheral sections 38a, 32a.

In assembling this engine mount device 20, the filling of the fluid (liquid) is carried out as follows: The fluid is previously filled in the elastic block cavity 36 after the upper and lower base plate members 22, 24 have been adhered to the elastic block 26, for example, under the action of vulcanization of the rubber material of the block 26. Then, the partition wall member 32 and the diaphragm member 38 are located in positions so as to allow an excessive fluid to overflow. Thereafter, the peripheral section of the cover member 42 is crimped as discussed above. Thus, the filling of fluid can be accomplished even in atmospheric air. Additionally, it is unnecessary to form a hole through the installation bolt 46, through which hole the fluid is filled into the elastic block fluid chamber 34. It is also unnecessary to fill whole the space of the elastic block cavity 36 with fluid and therefore a relatively small amount of the fluid is sufficient for the engine mount device. This is very advantageous from the economical standpoint.

FIG. 3 illustrates another embodiment of the engine mount device according to the present invention, which is similar to the embodiment of FIG. 2 with the exception that the diaphragm member 38 has a cylindrical mid-section 38c' which integrally connects the peripheral and central sections 38a, 38b of the diaphragm member 38. With this arrangement, when the fluid pressure is applied to the diaphragm member 38 upon the fluid flow from the fluid chamber 34 to the auxiliary chamber 40, the cylindrical mid-section 38c' deforms to decrease in its diameter as indicated in phantom. It will be understood that, also in this embodiment, it is unnecessary to fill whole the elastic block cavity 28 with the fluid. Besides, even if the fluid pressure is applied to the diaphragm member 38, the diaphragm member cylindrical mid-section 38c' deforms as mentioned above, and accordingly the diaphragm member 38 does not receive the tension which forces the diaphragm member peripheral section 38a to separate from the peripheral section 32a of the partition wall member 32.

FIG. 4 illustrates a further embodiment of the engine mount device according to the present invention, which is also similar to the embodiment of FIG. 2 except the shape of the diaphragm member 38 and the cover member 42. As shown, the diaphragm member 38 of this embodiment is formed with a projecting central section 38d directly and integrally connected to the peripheral section 38a. The central section 38d is curved smoothly toward the central section 32a of the partition wall member 32 when the fluid pressure is not applied thereto, as indicated by solid lines in FIG. 4. Additionally, the cover member 42 has a peripheral section 42b, and a flat central section 42c which integrally connects to the peripheral section 42b through a generally vertically elongated mid-section 42d so that a generally cup-shaped cavity is defined inside of the central section and mid-section 42c, 42d. Accordingly, the cover member 42 projects in the opposite direction to the partition wall member 32, so that the cover and partition wall members 42, 32 are generally symmetrical with each other with respect to a plane between the cover member flat peripheral section 42b and the partition wall member flat peripheral section 32a, thereby allowing a considerably large space of the air chamber 44 between the inner surface of the cover member 42 and the surface of the diaphragm member 38.

With the thus arranged engine mount device 20 of FIG. 4, when the elastic block 26 is compressed to decrease the volume of the fluid chamber 34, the fluid in the fluid chamber 34 moves through the orifice 36 into the auxiliary chamber 40 to increase the volume thereof. Consequently, the central section 38d of the diaphragm member 38 is upwardly moved to a position indicated in phantom in FIG. 4, in which the diaphragm member central section 38d largely projects upwardly or toward the cover member central section 42c. It will be understood that, although the diaphragm member 38 projects largely upwardly, the diaphragm member 38 is prevented from contacting with the cover member 42 since the cover member 42 is formed also to project largely upwardly.

When the elastic block 26 extends to increase the volume of the fluid chamber 34, the fluid pressure within the fluid chamber 34 lowers so that the fluid in the auxiliary chamber 40 moves through the orifice 36 to the fluid chamber 34. As a result, the volume of the auxiliary chamber 40 is decreased and accordingly the diaphragm member 38 restores to the position indicated by the solid lines. Thus, the fluid moving through the orifice 36 is subjected to flow restriction to provide suppression effect on the applied vibrational force, thereby effectively damping vibration applied to the engine mount device.

In this embodiment, since the diaphragm member 38 does not contact the cover member 42 even at the highest position of the central section 38d thereof, the diaphragm member 38 can be prevented from buckling thereof, thereby prolonging the life thereof.

Besides, when the fluid pressure is applied to the diaphragm member 38 to increase the volume of the auxiliary chamber 40, only the projecting direction of the diaphragm member varies so that no tension is applied to the diaphragm member 38 at the peripheral section 38a. This does not produce a force by which the diaphragm member peripheral section 38a is separated from the partition wall member peripheral section 32a.

While the cover member 42 has been shown and described as being integrally formed with the central section 42c and the mid-section 42d in the embodiment of FIG. 4, it will be understood that the cover member 42 may be constituted only by the peripheral section 42a thereby omitting the central section and mid-section so that the air chamber is not formed over the diaphragm member 38. In this case, the inner peripheral part of the flat peripheral section is raised upwardly with a rounded surface, by which the diaphragm member 38 can be effectively prevented from being damaged when the diaphragm member central section 38d projects upwardly.

As appreciated from the above, according to the present invention, both the partition wall member and the diaphragm member project into and are disposed within the central cavity of the elastic block at least when they are installed during engine mount device assembly step at which the fluid is filled to the fluid chamber and the auxiliary chamber. Therefore, it is unnecessary to fill the entire space of the elastic block cavity with the fluid, thereby saving the amount of the fluid used in the engine mount device. Furthermore, the filling operation of the fluid can be carried out in the atmospheric air and it is unnecessary to carry out by dipping it in liquid or by using injection equipment to supply the fluid into the cavity of the elastic block. Moreover, since the diaphragm member projects inward of the elastic block cavity, the diaphragm member is prevented from being pulled radially inwardly even when a fluid pressure is applied thereto. According, the press-contact force of the diaphragm member peripheral section is not lowered, so that the fluid is prevented from leaking through the installation section of the diaphragm member.

What is claimed is:

1. An engine mount device comprising:
   first and second base plate members which are spaced from each other;
   a block made of elastic material securely interposed between said first and second base plate members and formed with a cavity;
   a partition wall member connected to said first base plate member and including a projecting section which projects into and is located within said cavity of said elastic block, said partition wall member defining within said cavity of said elastic block a fluid chamber to be filled with a fluid, said partition wall member being formed with an orifice; and
   a diaphragm member connected to said partition wall member and including a projecting section which projects into and is located within said cavity of said elastic block, said diaphragm member further including a peripheral section at which said diaphragm member is connected to said partition wall member, said diaphragm member defining between it and said partition wall member an auxiliary chamber which communicates with said fluid chamber through said partition wall orifice, a major part of said auxiliary chamber being located within said cavity of said elastic block; and
   said projecting section of said diaphragm member having a generally spherically projecting diaphragm section which is projectable in opposite directions with respect to the peripheral section of said diaphragm member.

2. An engine mount device as claimed in claim 1, wherein said partition wall member has a peripheral section which is located on and in contact with said first base plate member, and said peripheral section of said diaphragm member is located on and in contact with said partition wall member peripheral section.

3. An engine mount device as claimed in claim 2, further comprising a cover member having a peripheral section which is located on and in contact with said diaphragm member peripheral section.

4. An engine mount device as claimed in claim 3, further comprising means for tightly keeping said partition wall member peripheral section and said diaphragm member peripheral section between said first base plate member and said cover member peripheral section.

5. An engine mount device as claimed in claim 1, wherein said first and second base plate members are connected to an engine and a vehicle body, respectively.

6. An engine mount device as claimed in claim 1, wherein said projecting section of said partition wall member includes a central section located within said cavity of said elastic block and spaced from said first base plate member, and a connecting section generally vertically extending and integrally connecting said central section with said peripheral section.

7. An engine mount device as claimed in claim 1, wherein said projecting section of said partition wall member defines a hollow thereby, wherein said projecting section of said diaphragm member is located within said hollow.

8. An engine mount device as claimed in claim 1, said elastic block is generally in the shape of a pipe, wherein said cavity being formed in the axial direction of said elastic block and having the same sectional area throughout the length of said elastic block.

9. An engine mount block as claimed in claim 1, wherein said first base plate member is formed with a central opening through which said projecting sections of said partition wall and diaphragm members project into said cavity of said elastic block.

10. An engine mount device as claimed in claim 1, wherein said means for tightly keeping includes a crimped section forming part of said cover member peripheral section, said crimped section engaging a peripheral section of said first base plate member so that said partition wall member peripheral section and said diaphragm member peripheral section are tightly clamped between said first base plate member and said cover member peripheral section.

* * * * *